(12) United States Patent
Shimada

(10) Patent No.: US 6,687,812 B1
(45) Date of Patent: Feb. 3, 2004

(54) PARALLEL PROCESSING APPARATUS

(75) Inventor: Sachiko Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,041

(22) Filed: Apr. 20, 2000

(30) Foreign Application Priority Data

Apr. 20, 1999 (JP) .......................................... 11-112895

(51) Int. Cl.$^7$ ................................................ G06F 9/30
(52) U.S. Cl. ......................... 712/230; 712/235; 712/240
(58) Field of Search ................................ 712/235, 239, 712/240, 238, 237, 230, 233, 234, 211, 212, 213, 215, 23

(56) References Cited

U.S. PATENT DOCUMENTS

| | | | | |
|---|---|---|---|---|
| 5,717,926 A | * | 2/1998 | Browning et al. | 709/104 |
| 5,724,565 A | * | 3/1998 | Dubey et al. | 712/245 |
| 5,812,811 A | * | 9/1998 | Dubey et al. | 712/216 |
| 5,958,047 A | * | 9/1999 | Panwar et al. | 712/237 |
| 5,961,639 A | * | 10/1999 | Mallick et al. | 712/242 |
| 6,065,115 A | * | 5/2000 | Sharangpani et al. | 712/235 |
| 6,304,960 B1 | * | 10/2001 | Yeh et al. | 712/236 |
| 6,330,662 B1 | * | 12/2001 | Patel et al. | 712/236 |

FOREIGN PATENT DOCUMENTS

| | | | |
|---|---|---|---|
| EP | 0 697 653 A1 | * | 2/1996 |
| JP | 8-227364 | | 9/1996 |
| JP | 10-78880 | | 3/1998 |

OTHER PUBLICATIONS

J. Hennessy et al., "Computer Architecture—A Quantitative Approach", Japanese language version, pp. 302–307 and English language equivalent , pp. 262–278.
R.S. Nikhil et al., "*T: A Multithreaded Massively Parallel Architecture", pp. 156–167 with Abstract.
S. Torii et al., "Control Parallel On–Chip Multi–processor: MUSCAT", pp. 229–236 with English Abstract.

* cited by examiner

*Primary Examiner*—Henry W. H. Tsai
(74) *Attorney, Agent, or Firm*—Sughrue Mion, PLLC

(57) ABSTRACT

Disclosed is a parallel processing apparatus capable of reducing power consumption by efficiently executing a fork instruction for activating a plurality of processors. The parallel processing apparatus has a processor element (10) for generating (forking) a thread consisting of a plurality of instructions of an external unit. The processor element comprises a fork-instruction predicting section (14) which includes a predicting section for predicting whether or not the fork condition of a fork-conditioned fork instruction is satisfied after fetching but before executing the instruction.

76 Claims, 12 Drawing Sheets

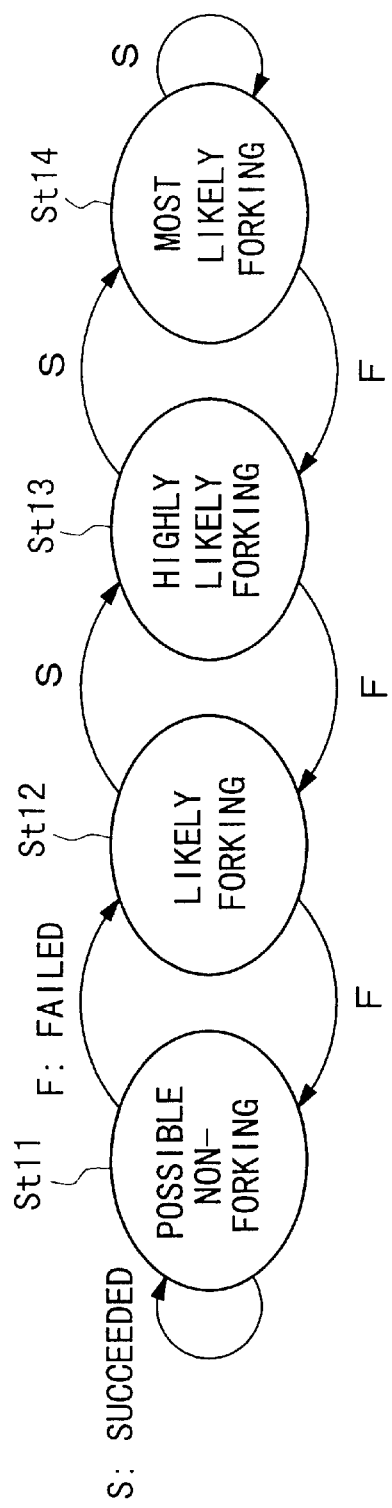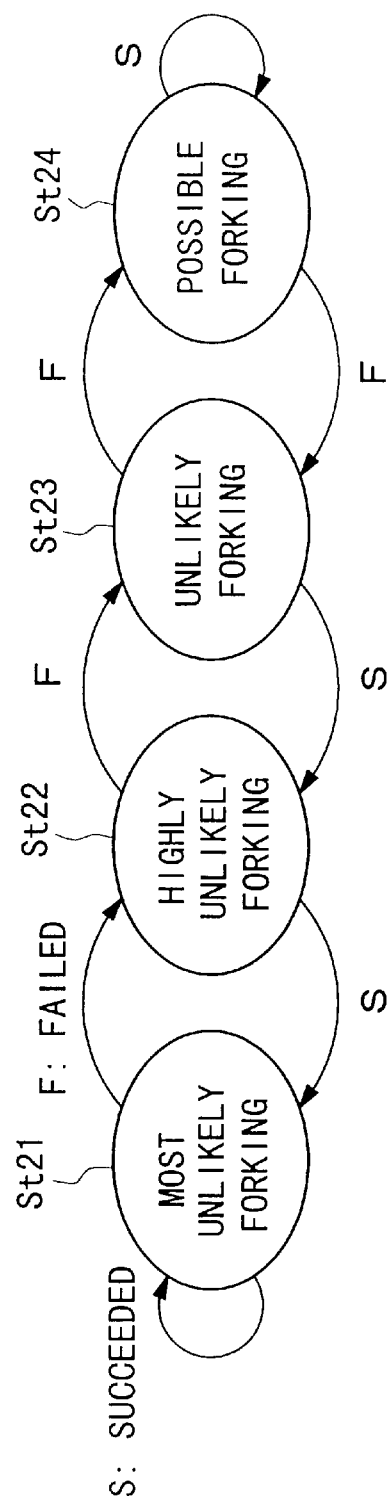

FIG. 12

| HISTORY INFORMATION | 11 | 10 | 01 | 00 |
|---|---|---|---|---|
| CONDITIONAL BRANCHING INSTRUCTION | HIGHLY LIKELY TO EXECUTE | LIKELY TO EXECUTE | UNLIKELY TO EXECUTE | HIGHLY UNLIKELY TO EXECUTE |
| SPECULATION FORK INSTRUCTION | HIGHLY LIKELY TO FORKING | LIKELY FORKING | UNLIKELY FORKING | HIGHLY UNLIKELY FORKING |
| SPECULATION FORK INSTRUCTION WITH HIGH PROBABILITY OF FORKING | MOST LIKELY FORKING | HIGHLY LIKELY FORKING | LIKELY FORKING | POSSIBLE NON-FORKING |
| SPECULATION FORK INSTRUCTION WITH LOW PROBABILITY OF FORKING | POSSIBLE FORKING | UNLIKELY FORKING | HIGHLY UNLIKELY FORKING | MOST UNLIKELY FORKING |
| CONDITIONED THREAD-END INSTRUCTION | HIGHLY LIKELY TERMINATION | LIKELY TERMINATION | UNLIKELY TERMINATION | HIGHLY UNLIKELY TERMINATION |
| CONDITIONED THREAD-END INSTRUCTION WITH HIGH PROBABILITY OF ENDING | MOST LIKELY TERMINATION | HIGHLY LIKELY TERMINATION | LIKELY TERMINATION | POSSIBLE NON-TERMINATION |
| CONDITIONED THREAD-END INSTRUCTION WITH LOW PROBABILITY OF ENDING | POSSIBLE TERMINATION | UNLIKELY TERMINATION | HIGHLY UNLIKELY TERMINATION | MOST LIKELY TERMINATION |

PARALLEL PROCESSING APPARATUS

BACKGROUND OF THE INVENTION

1. Field of the Invention

The present invention relates to a parallel processing apparatus, and, more particularly, to a parallel processing apparatus which processes programs in parallel while generating and terminating a thread consisting of a plurality of instructions in a plurality of processors.

2. Description of the Related Art

Today's typical computers are of a von Neumann-type whose built-in processor that plays the key role in each computer repeats a sequence of procedures of fetching a single instruction, decoding it, executing a process specified by that instruction, accessing the memory and writing the execution result back in the memory.

To improve the processing speed, the current computers each have a cache memory with a fast access speed provided between the main memory and the processor. The processor therefore mainly exchanges data with the cache memory. The operation of the processor of reading an instruction from the cache memory is called "instruction fetching", and the operation of decoding an instruction is called "instruction decoding", and the operation of writing the execution result back into the memory is called "write back".

Pipelining is known as one of techniques that improve the processing speed of processors. The "pipelining" process is described in many books about computers, for example, "Computer Architecture" by Hennessy and Patterson. Pipelining is the technique that improves the processing performance by allowing a plurality of instructions, each of which performs only a part of the entire process, to be executed in an overlapped manner in one clock cycle.

FIG. 13 is a diagram for explaining a pipelining process.

An instruction is executed in separate pipeline stages called "instruction fetching (IF)", "instruction decoding (ID)", "instruction execution (EX)", "memory access (MEM)" and "write back (WB)". In cycle T1, an instruction at an address "1000" undergoes instruction fetching. In cycle T2, the instruction at the address "1000" undergoes instruction decoding and an instruction at an address "1004" undergoes instruction fetching at the same time. This technique of simultaneously executing a plurality of instructions in an overlapped manner is called "pipelining". Registers placed between processes are called "pipeline registers" and a process unit for carrying out each process is called a "pipeline stage". As is apparent from the above, pipelining speeds up the processing as a whole by executing instructions, described in a program, in parallel.

However, there occurs a circumstance where an instruction cannot be executed in the proper cycle due to a change in the program flow caused by a branching instruction. While a scheme of computing the address of the branching destination specified by the branching instruction at an early stage in the pipeline stages, such as the ID stage, is taken for faster processing, the branching destination cannot be determined for a conditional branching instruction until the condition is determined. For a conditional branching instruction, therefore, the cycle that stops pipelining is eliminated by carrying out a scheme of predicting whether or not its branching condition is satisfied by using history information (see pp. 302 to 307 in the aforementioned book entitled "Computer Architecture" by Hennessy and Patterson).

A "superscalar" system ("Superscalar" by Johnson) which improves the processing speed by providing a plurality of processing elements or processor elements in a single processor and simultaneously generating a plurality of instructions has already been put to a practical use. The superscalar system is ideally capable of executing instructions equal in number to the provided processor elements in one clock. It is however said that even if the number of processor elements should be increased limitlessly, instructions would not be smoothly executed due to a branching instruction and the actual performance would be restricted to about three to four times that of the case of using a single processor.

Another practical way of improving the processing speed is to perform parallel processing by using a plurality of processors. In a typical processor system which accomplishes parallel processing by using a plurality of processors, parallel processing is executed by carrying out communication among the processors to assign processes to the individual processors. A system which uses conventional processors accomplishes such communication by an interruption processing scheme that is from outside carried out externally each processor as an interrupt control on that processor.

In the interruption processing scheme, when an external unit interrupts a processor, a program to be executed in the processor is switched to an interruption program from a user program and the interruption process is then executed. When the interruption process is completed, the original user program is resumed. To switch the execution program in a processor, data which will be used again by the original user program, such as data in the program counter or register file, is saved in a memory device. The overhead that is need for such data saving for switching between programs is non-negligibly large and an interruption process is generally takes time. A parallel processing system which uses interruption processing therefore suffers a large overhead in communications between processors, which is an impediment in enhancing the performance.

One solution to this problem is a so-called multi-thread architecture. This technique is disclosed in, for example, "A Multi-threaded Massively Parallel Architecture", Proceedings of 19th International Symposium on Computer Architecture, R. S. Nikhil, G. M. Papadopuolos, and Arvind, pp. 156–167.

A "thread" is a sequence of instructions. A program consists of a plurality of threads. In a multi-thread architecture, thread-by-thread processes are assigned to a plurality of processors so that those processors can process threads in parallel. Therefore, the multi-thread architecture has a mechanism and an instruction for allowing a thread which is being executed on one processor to generate a new thread on another processor.

The generation of a new thread on another processor is called "to fork a thread" and an instruction to fork a thread is called a "fork instruction". A fork instruction specifies to which processor element a thread should be forked and which thread to fork.

Control parallel processing has been proposed in, for example, "Proposition Of On Chip MUlti-Stream Control Architecture (MUSCAT)" by Torii et al., Joint Symposium Parallel Processing JSPP '97, pp. 229–236. The multi-stream control architecture analyzes the control flow of a program, predicts a path which is very likely to be executed soon, and speculatively executes the path before its execution is established. In this manner, the multi-stream control processes programs in parallel.

FIG. 14 is a diagram showing a model of multi-stream control.

A conventional sequence of instructions which are executed sequentially consists of threads A, B, and C. In the sequential execution, one processor processes the threads A, B, and C in order as shown in section (a) in FIG. 14. In the multi-stream control, by way of contrast, while a processor element (PE)#0 is processing the thread A, the thread B which is expected to be executed later is forked to and is processed by a processor element #1 as shown in section (b) in FIG. 14. The processor element #1 forks the thread C to a processor element #2. The speculative execution of threads which are expected to be executed later can ensure parallel processing of threads, thus improving the processing performance.

The aforementioned paper that has proposed the "MUSCAT" mentions that it is not always possible to predict, before execution, whether or not a thread is to be forked. It is also known that adequate parallel processing cannot be achieved merely by the established forking that involves threads whose forking has been established before execution. In this respect, the MUSCAT employs controlled speculation that analyzes a program at the time of compiling it and speculatively executes a thread which is highly likely to be executed before its execution is established. The fork instruction that is to be speculatively executed is called a "speculation fork instruction". If the speculative execution in the multi-stream control has failed, however, the thread that has been speculatively executed must be canceled before actual execution. This means a wasteful operation of the processor elements, which undesirably leads to increased power consumption.

A thread which is executed by each processor element finishes a series of processes by its end instruction. When a thread is forked by a speculation fork instruction, the termination of the thread becomes effective in response to the end instruction. When a thread is not forked, however, it may be unnecessary to execute such an end instruction in some cases. To cope with this situation, the MUSCAT uses a conditioned end instruction so that executing an end instruction depends on whether or not that condition is met. As a plurality of threads are processed in parallel, however, a conditioned end instruction, which is to be executed after the condition is met, may be processed in the multi-stream control before an instruction to determine that condition is executed. In such a case, the conditioned end instruction should wait for the processing of the condition-determining instruction to end. If the termination is decided, fetching or the like of subsequent instructions which becomes wasteful is carried out until the condition is determined. This also results in increased power consumption.

SUMMARY OF THE INVENTION

Accordingly, it is an object of the present invention to provide a parallel processing apparatus which is used in a processor system that carries out parallel processing using a plurality of processors and which efficiently executes fork instructions for activating a plurality of processors, thereby reducing power consumption.

It is another object of this invention to provide a parallel processing apparatus capable of efficiently terminating a thread with respect to the aforementioned conditioned end instruction for the thread.

It is a further object of this invention to provide a parallel processing apparatus which efficiently accomplishes the execution of the aforementioned speculation fork instruction and thread-end-conditioned thread-end instruction in the form of a hardware unit.

To achieve the above objects, according to the first aspect of this invention, there is provided a parallel processing apparatus having processing means for generating (forking) a thread consisting of a plurality of instructions on an external unit, the processing means including a predicting section for making a prediction of whether or not a fork condition of a fork-conditioned fork instruction is satisfied after fetching but before executing the instruction.

According to the second aspect of this invention, there is provided a parallel processing apparatus comprising processing means having means for issuing an externally forked thread, the processing means including a predicting section for making a prediction of whether or not a thread-end condition of a thread-end-conditioned thread-end instruction for terminating the forked thread is satisfied after fetching but before executing the instruction.

According to the third aspect of this invention, there is provided a parallel processing apparatus comprising processing means for generating a thread consisting of a plurality of instructions on an external unit, the processing means including:

means for issuing an externally forked thread; and a predicting section for predicting whether or not a fork condition of a fork-conditioned fork instruction is satisfied after fetching but before executing the fork instruction and whether or not a thread-end condition of a thread-end-conditioned thread-end instruction for terminating the forked thread is satisfied after fetching but before executing the thread-end instruction.

According to one modification of the parallel processing apparatuses of the first to third aspects, in addition to making the prediction, when an input instruction is a conditional branching instruction, the predicting section predicts whether or not the conditional branching instruction is satisfied.

In any one of the above-described parallel processing apparatuses, a plurality of the processing means may be provided.

In any one of the above-described parallel processing apparatuses, the predicting section may make the prediction using history information. In this case, it is preferable that the history information have a plurality of states according to probabilities of the prediction. In the latter case, the predicting section may predict the fork condition, the thread-end condition or the conditional branching instruction based on the states.

In the parallel processing apparatus according to the first aspect, it is preferable that the fork-conditioned fork instruction include information about the result of previous analysis of the probability of the fork condition, and the predicting section predicts whether or not the fork condition is satisfied in accordance with the probability.

In the parallel processing apparatus according to the second aspect, it is preferable that the thread-end-conditioned thread-end instruction include information about the result of previous analysis of the probability of the thread-end condition, and the predicting section predicts whether or not the thread-end condition is satisfied in accordance with the probability.

In the parallel processing apparatus according to the third aspect, it is preferable that the fork-conditioned fork instruction include information about results of previous analysis of the probability of the fork condition and a probability of the thread-end condition, and the predicting section predicts whether or not the fork condition and the thread-end condition are satisfied in accordance with the probabilities.

In the parallel processing apparatus according to the aforementioned second case, the processing means may further include memory means for storing the history information associated with at least two of the fork condition, the thread-end condition, and the conditional branching instruction.

In the parallel processing apparatus according to the modification, the processing means may further include address generating means for generating a top instruction address of a thread to be generated when the fork condition is satisfied and generating an instruction address of a branching target when the conditional branching instruction is satisfied.

According to a more specific example of the first aspect of this invention, there is provided a parallel processing apparatus comprising:

analysis means for analyzing an input instruction;

prediction means for, when the instruction analyzed by the analysis means is a fork-conditioned fork instruction, predicting whether or not a fork condition of the fork-conditioned fork instruction is satisfied after fetching but before executing the instruction and sending out a fork instruction in accordance with a result of the prediction; and execution means for executing the instruction, deciding whether or not the prediction of the fork instruction is correct, and sending out an instruction to cancel a thread generated by the fork instruction, when the fork instruction has been sent out and the prediction is wrong.

According to a more specific example of the second aspect of this invention, there is provided a parallel processing apparatus comprising:

analysis means for analyzing an input instruction;

prediction means for, when the instruction analyzed by the analysis means is a thread-end-conditioned thread-end instruction for terminating a forked thread, predicting whether or not a thread-end condition of the thread-end-conditioned thread-end instruction is satisfied after fetching but before executing the instruction, and sending out a thread-end instruction in accordance with a result of the prediction; and execution means for executing the instruction, deciding whether or not the prediction of the thread-end instruction is correct, and sending out an instruction to cancel stopping of a thread which has been stopped by the thread-end instruction, when the thread-end instruction has been sent out and the prediction is wrong.

In the parallel processing apparatus according to the specific examples of the first and second aspects of this invention, it is preferable that the prediction means should include memory means for storing history information and update means for updating the history information stored in the memory means;

the execution means informs the update means of a result of the decision; and the update means updates the history information in accordance with the result of the decision.

BRIEF DESCRIPTION OF THE DRAWINGS

FIG. 5 is a status-transition chart for explaining an algorithm for predicting forking of a thread by using history information which is used in the predicting section 34 when the thread is very likely to be forked;

FIG. 6 is a status-transition chart for explaining an algorithm for predicting forking of a thread by using history information which is used in the predicting section 34 when the thread is not likely to be forked;

FIG. 12 is a table for explaining history information in a history buffer 32;

DETAILED DESCRIPTION OF THE PREFERRED EMBODIMENTS

Parallel processing apparatuses according to preferred embodiments of this invention will now be described in detail with reference to the accompanying drawings.

First Embodiment

Figure 1:
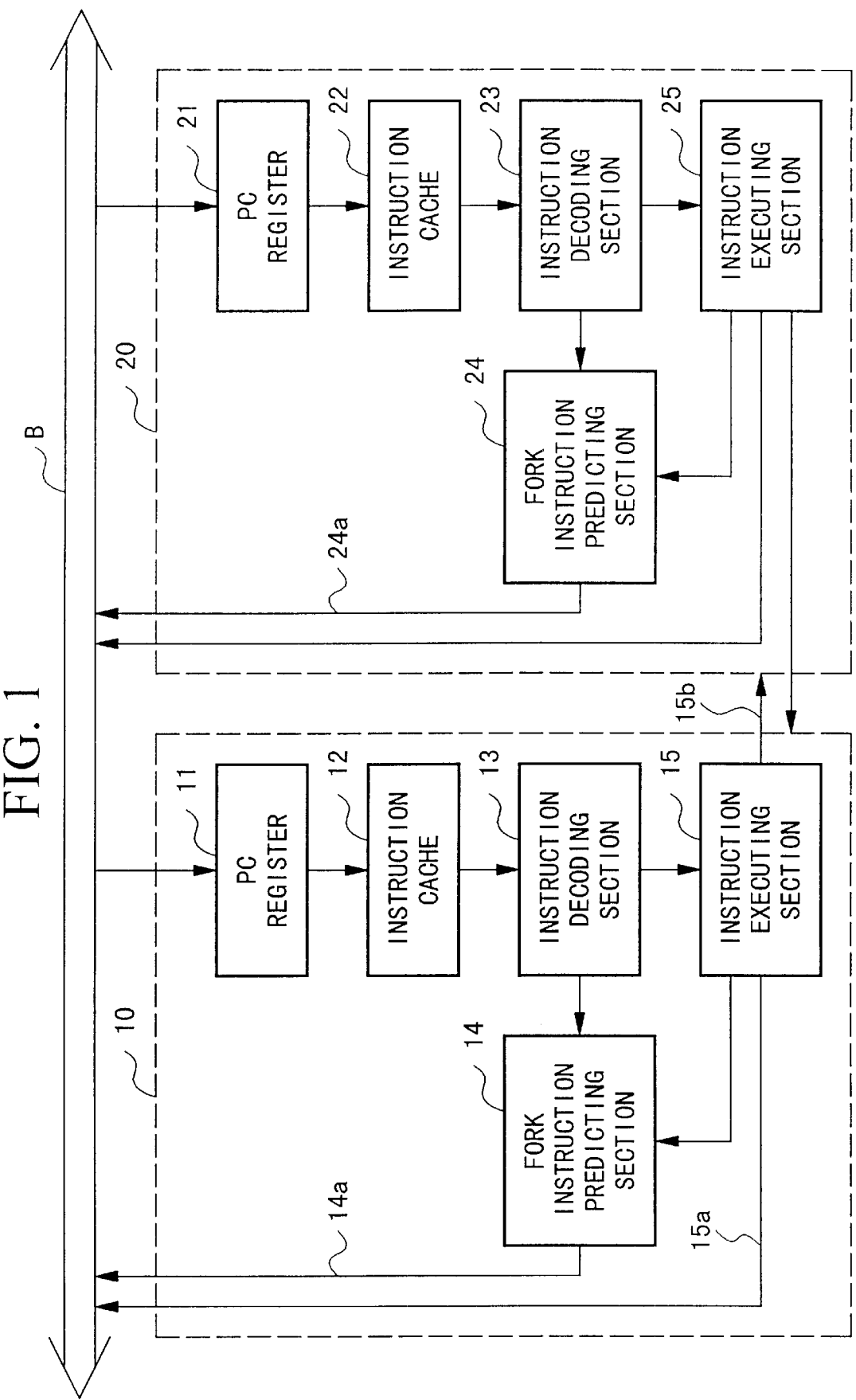
FIG. 1 is a block diagram illustrating the structure of a parallel processing apparatus according to a first embodiment of this invention.

FIG. 1 is a block diagram illustrating the structure of a parallel processing apparatus according to the first embodiment of this invention.

As shown in FIG. 1, the parallel processing apparatus according to the first embodiment of this invention has two sets of processor elements (PE) 10 and 20 which are connected together by a bus B. The processor element 10 comprises a program counter register (hereinafter called "PC register") 11, an instruction cache 12, an instruction decoding section 13, a fork-instruction predicting section 14, and an instruction executing section 15. The processor element 20 likewise comprises a program counter register 21, an instruction cache 22, an instruction decoding section 23, a fork-instruction predicting section 24, and an instruction executing section 25.

Each of the PC registers 11 and 21 holds the address of an instruction to be processed. The instruction caches 12 and 22 respectively cache instructions output from the PC registers 11 and 21. The instruction decoding sections 13 and 23 read and decode the instructions cached in the respective instruction caches 12 and 22. Each of the fork-instruction predicting sections 14 and 24 predicts whether or not a speculation fork instruction (fork-conditioned fork instruction) forks a thread in accordance with the history information of a fork instruction which is held in the predicting section. The instruction executing sections 15 and 25 execute the instructions that have been decoded by the respective instruction decoding sections 13 and 23. Each of the instruction executing sections 15 and 25 also determines if the prediction of the speculation fork instruction is correct.

The fork-instruction predicting sections 14 and 24 will now be discussed in detail.

Figure 2:
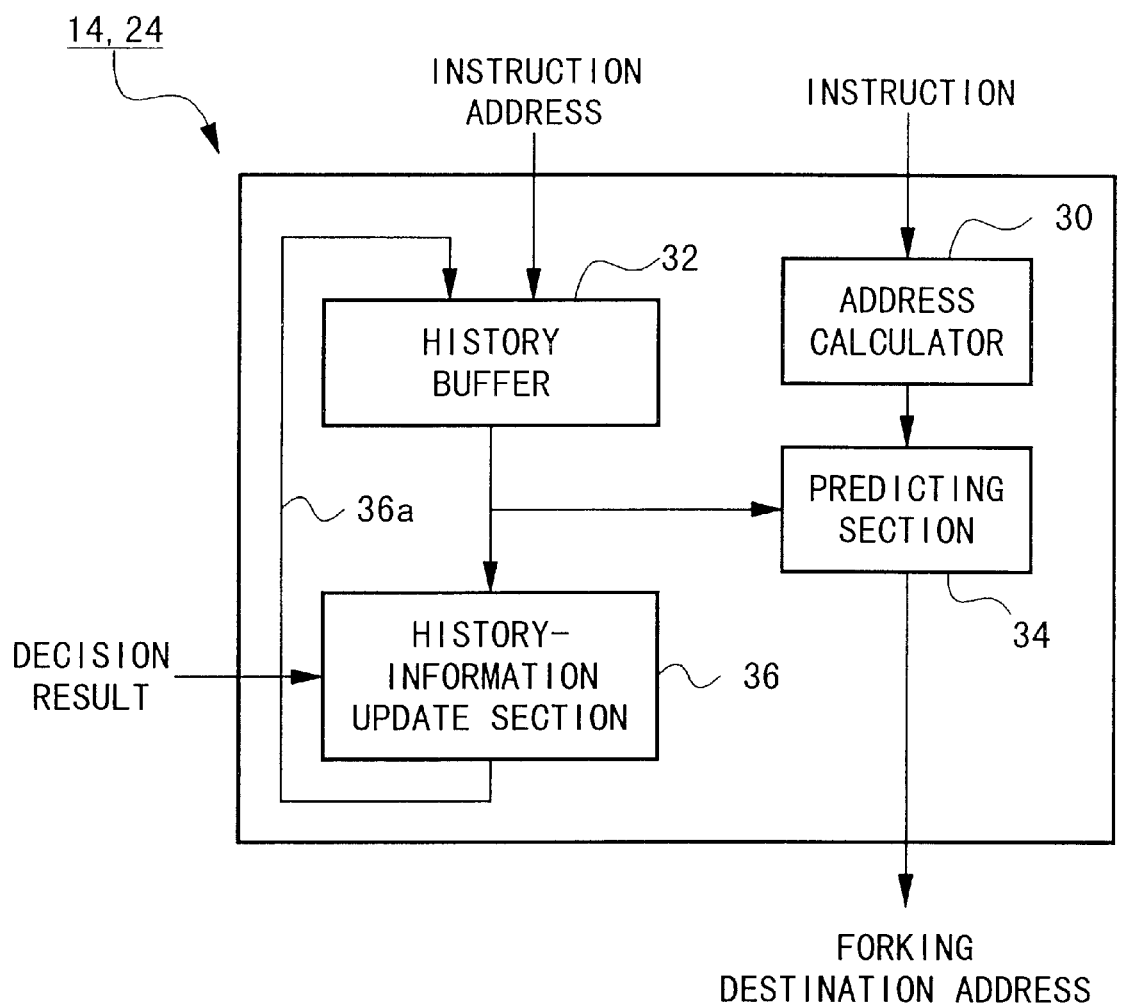
FIG. 2 is a block diagram showing the internal structure of fork-instruction predicting sections 14 and 24.

FIG. 2 is a block diagram showing the internal structure of the fork-instruction predicting sections 14 and 24.

As shown in FIG. 2, each fork-instruction predicting section 14 or 24 comprises an address calculator 30, a history buffer 32, a predicting section 34 and a history-information update section 36.

The address calculator 30 computes the address of the forking destination from an instruction output from the associated instruction decoding section 13 or 23. The history buffer 32 stores history information indicating whether or not a speculation fork instruction has forked a thread. The predicting section 34 predicts whether or not a thread should be forked, based on the history information stored in the history buffer 32. The history-information update section 36 receives the result of a decision from the associated instruction executing section 15 or 25 in FIG. 1 and updates the history information stored in the history buffer 32 based on the decision result.

A description will now be given of the operation of the fork-instruction predicting section 14 or 24 having the above-described structure.

First, when the instruction decoding section 13 or 23 outputs a decoded instruction, the address calculator 30 calculates the address of the forking destination and sends it to the predicting section 34. When the instruction decoding section 13 or 23 outputs an instruction address, the history buffer 32 outputs history information according to this instruction address and provides the predicting section 34 and the history-information update section 36 with the history information. Based on the input history information, the predicting section 34 predicts whether or not the thread is to be forked.

When the predicting section 34 predicts that the thread is to be forked, the address of the forking destination output from the address calculator 30 is sent on a signal line 14a or 24a as the forking-destination address. When receiving the result of a decision on a fork prediction from the associated instruction executing section 15 or 25, the history-information update section 36 updates the retained history information and writes the updated history information in the history buffer 32 via a signal line 36a.

An explanation will now be given of an algorithm for predicting forking of a thread by using history information which is used in the predicting section 34 in FIG. 2.

Figure 3:
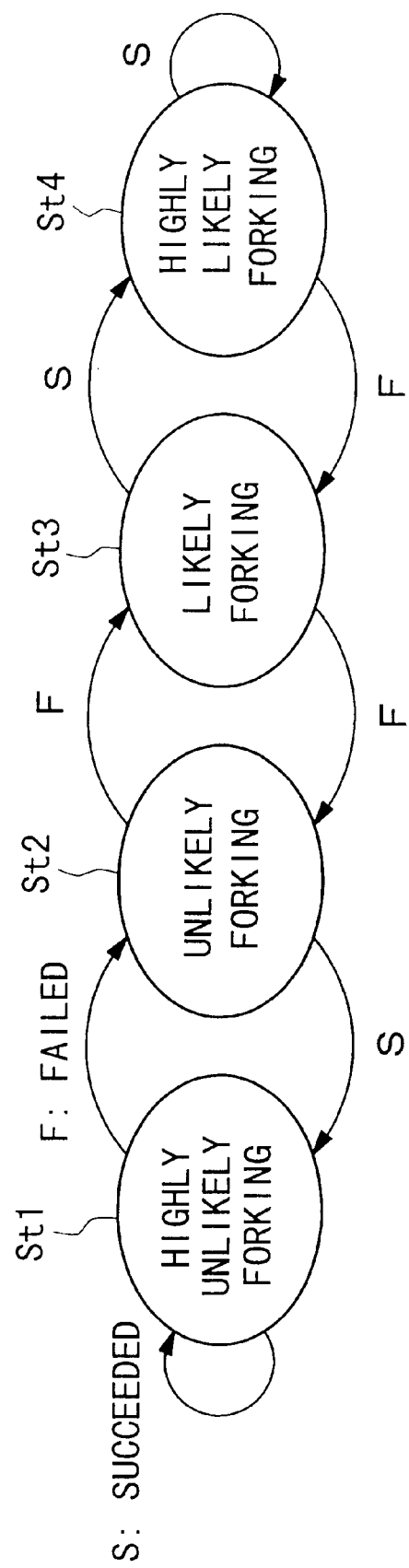
FIG. 3 is a status-transition chart for explaining an algorithm for predicting forking of a thread by using history information which is used in a predicting section 34.

FIG. 3 is a status-transition chart for explaining an algorithm for predicting forking of a thread by using history information which is used in the predicting section 34.

The history information stored in the history buffer 32 can represent four states. The four states are:

highly unlikely forking (St 1)
unlikely forking (St 2)
likely forking (St 3)
highly likely forking (St 4)

When the history information indicates either "highly unlikely forking" (St 1) or "unlikely forking" (St 2), the predicting section 34 predicts that a thread will not be forked. When the history information indicates either "likely forking" (St 3) or "highly likely forking" (St 4), the predicting section 34 predicts that a thread will be forked.

The state of the history information changes in accordance with the result of a decision on prediction as follows.

In the case where the history information specifies "highly unlikely forking" (St 1), when the prediction is a success, the state does not change and remains as "highly unlikely forking" (St 1). When prediction is a failure, the state changes to "unlikely forking" (St 2).

In the case where the history information specifies "unlikely forking" (St 2), when the prediction is a success, the state changes to "highly unlikely forking" (St 1). When the prediction ends in failure, the state changes to "likely forking" (St 3).

In the case where the history information specifies "likely forking" (St 3), when the prediction is a success, the state changes to "highly likely forking" (St 4). When the prediction is unsuccessful, the state changes to "unlikely forking" (St 2).

In the case where the history information specifies "highly likely forking" (St 4), when the prediction is successful, the state does not change and stays as "highly likely forking" (St 4). When the prediction ends in failure, the state changes to "likely forking" (St 3).

Using the above algorithm, the predicting section 34 predicts whether or not a thread will be forked based on the input history information.

The general operation of the parallel processing apparatus with the above-described structure according to the first embodiment of this invention will be discussed below.

Figure 4:
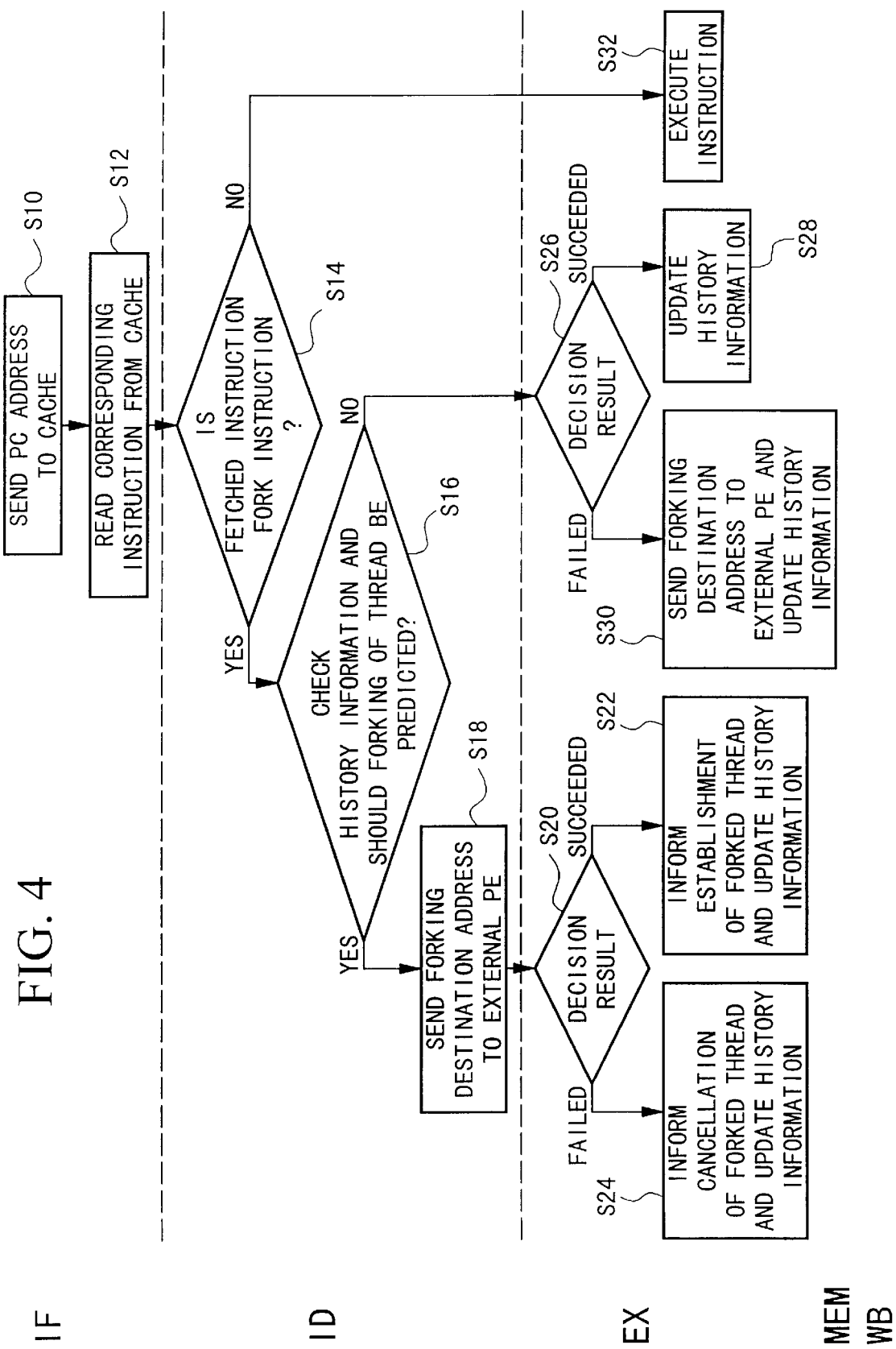
FIG. 4 is a flowchart illustrating the general operation of the parallel processing apparatus according to the first embodiment of this invention.

FIG. 4 is a flowchart illustrating the general operation of the parallel processing apparatus according to the first embodiment of this invention.

In FIG. 4, IF, ID, EX, MEM and WB are pipeline stages, respectively indicating an instruction fetching stage, an instruction decoding stage, an instruction executing stage, a memory access stage, and a write-back stage.

In the IF stage, the processor element 10 sends an address stored in the PC register 11 to the instruction cache 12 (step S10). Then, the instruction decoding section 13 fetches from the instruction cache 12 an instruction specified by the address sent to the instruction cache 12 from the PC register 11 (step S12).

In the next ID stage, the instruction decoding section 13 decodes the instruction fetched in step S12 and determines a process to be executed. The instruction decoding section 13 also determines if the decoded instruction is a speculation fork instruction (step S14). When the fetched instruction is a speculation fork instruction, the instruction decoding section 13 informs the fork-instruction predicting section 14 to that effect. When the decoded instruction is not a speculation fork instruction, on the other hand, this instruction is executed in step S32.

When informed of the instruction being a speculation fork instruction, the fork-instruction predicting section 14 predicts whether or not the speculation fork instruction will fork a thread in accordance with the history information of the fork instruction that is held in the predicting section 14 (step S16).

When the decision result is "YES", i.e., when it is predicted that the speculation fork instruction will fork a thread, the fork-instruction predicting section 14 sends the address of the forking destination to the PC register 21 of the processor element 20 via the signal line 14a and the bus B (step S18). This process generates a new thread for the processor element 20 which in turn starts processing an instruction. The processing by the processor element 10 proceeds to step S20.

When the decision result in step S16 is "NO", i.e., when it is predicted that the speculation fork instruction will not fork a thread, the fork-instruction predicting section 14 does not generate a thread on the processor element 20 and proceeds to step S26.

In the EX stage, the instruction executing section 15 executes the instruction decoded by the instruction decoding section 13. The instruction executing section 15 also determines if the prediction of the speculation fork instruction is correct (steps S20 and S26).

When the decision result in step S20 is a "success", it means that the prediction that "the thread will be forked" has been successful. In this case, the execution of the instruction continues and the instruction executing section 15 informs the fork-instruction predicting section 14 of the "successful prediction". The fork-instruction predicting section 14 updates the history information of the speculation fork instruction. Further, the processor element 20 is informed of the establishment of the forked thread via a signal line 15b (step S22).

When the decision result in step S20 is a "failure", it means that the prediction that "the thread will be forked" has ended in failure and the processor element 20 is informed of that failure via the signal line 15b and the forked thread is canceled. The instruction executing section 15 informs the fork-instruction predicting section 14 of the "prediction failure". When informed of the failure, the fork-instruction predicting section 14 updates the history information of the speculation fork instruction (step S24).

When the above processing is completed, the processor element 10 continues executing the instruction.

When the decision result in step S26 is a "success", it means that the prediction that "the thread will not be forked" has been successful and the instruction executing section 15 informs the fork-instruction predicting section 14 of the "successful prediction". Then, the fork-instruction predicting section 14 updates the history information of the speculation fork instruction (step S28).

When the decision result in step S26 is a "failure", it means that the prediction that "the thread will not be forked" has ended in failure and the instruction executing section 15 sends the address of the forking destination to the PC register 21 of the processor element 20 via the signal line 15b and the bus B. As a result, a new thread is generated on the processor element 20 which in turns starts processing an instruction. The instruction executing section 15 informs the fork-instruction predicting section 14 of the "prediction failure", and the fork-instruction predicting section 14 updates the history information of the speculation fork instruction (step S30).

According to this embodiment, as described above, because the predicting section 34 predicts forking of a thread based on the history information, it is possible to suppress the generation of unnecessary threads by efficiently executing the generation of a new thread and the termination of a thread. This leads to a reduction in power consumption.

An explanation will now be given of an algorithm for predicting forking of a thread by using history information which is used in the predicting section 34 in FIG. 2 when there is a high probability that the thread will be forked.

FIG. 5 is a status-transition chart for explaining an algorithm for predicting forking of a thread by using history information which is used in the predicting section 34 when the thread is very likely to be forked.

The history information stored in the history buffer 32 represents four states as per the case that has been explained with reference to FIG. 3. The following are the four states for a speculation fork instruction with a high probability of forking.

possible non-forking (St 11)
likely forking (St 12)
highly likely forking (St 13)
most likely forking (St 14)

When the history information indicates "most likely forking" (St 14), "highly likely forking" (St 13) or "likely forking" (St 12), the predicting section 34 predicts that a thread will be forked. Only when the history information indicates "possible non-forking" (St 11), the predicting section 34 predicts that a thread will not be forked.

The state of the history information changes in accordance with the result of a decision on prediction as follows.

In the case where the history information specifies "possible non-forking" (St 11), when the prediction is a success, the state does not change and remains as "possible non-forking" (St 11). When prediction is a failure, the state changes to "likely forking" (St 12).

In the case where the history information specifies "likely forking" (St 12), when the prediction is a failure, the state changes to "possible non-forking" (St 11). When the prediction is a success, the state changes to "highly likely forking" (St 13).

In the case where the history information specifies "highly likely forking" (St 13), when the prediction is successful, the state changes to "most likely forking" (St 14). When the prediction is unsuccessful, the state changes to "likely forking" (St 12).

In the case where the history information specifies "most likely forking" (St 14), when the prediction is successful, the state does not change and stays as "most likely forking" (St 14). When the prediction ends in failure, the state changes to "highly likely forking" (St 13).

Using the above algorithm, the predicting section 34 predicts whether or not to fork a thread based on the input history information.

In short, when a speculation fork instruction is determined as having a high probability of forking a thread in the analysis that has been carried out during compiling, the algorithm shown in FIG. 5 includes information about that probability in the instruction. At the time of predicting such a speculation fork instruction having a high probability of forking a thread, the number of states in which it is predicted that the "thread will be forked" is made greater than, and different from, the number of states in which it is predicted that the "thread will not be forked".

A description will now be given of an algorithm for predicting forking of a thread by using history information which is used in the predicting section 34 in FIG. 2 when there is a low probability that the thread will be forked.

FIG. 6 is a status-transition chart for explaining an algorithm for predicting forking of a thread by using history information which is used in the predicting section 34 when the thread is not likely to be forked.

The history information stored in the history buffer 32 represents four states as per the case that has been explained with reference to FIG. 3. The following are the four states for a speculation fork instruction with a high probability of forking.

most unlikely forking (St 21)
highly unlikely forking (St 22)
unlikely forking (St 23)
possible forking (St 24)

When the history information indicates "most unlikely forking" (St 21), "highly unlikely forking" (St 22) or "unlikely forking" (St 23), the predicting section 34 predicts that a thread will not be forked. Only when the history information indicates "possible forking" (St 24), the predicting section 34 predicts that a thread will be forked.

The state of the history information changes in accordance with the result of a decision on prediction as follows.

In the case where the history information specifies "most unlikely forking" (St 21), when the prediction is a success, the state does not change and remains as "most unlikely forking" (St 21). When prediction is a failure, the state changes to "highly unlikely forking" (St 22).

In the case where the history information specifies "highly unlikely forking" (St 22), when the prediction ends in failure, the state changes to "unlikely forking" (St 23). When the prediction is a success, the state changes to "most unlikely forking" (St 21).

In the case where the history information specifies "unlikely forking" (St 23), when the prediction is successful, the state changes to "highly unlikely forking" (St 22). When the prediction is unsuccessful, the state changes to "possible forking" (St 24).

In the case where the history information specifies "possible forking" (St 24), when the prediction is successful, the state does not change and stays as "possible forking" (St 24). When the prediction ends in failure, the state changes to "unlikely forking" (St 23).

Using the above algorithm, the predicting section 34 predicts whether or not to fork a thread based on the input history information.

When a speculation fork instruction is determined as having a low probability of forking a thread in the analysis that has been carried out before actual execution of the instruction, information about that probability is included in the instruction. At the time of predicting such a speculation fork instruction having a low probability of forking a thread, the number of states in which it is predicted that the "thread will be forked" is made smaller than, and different from, the number of states in which it is predicted that the "thread will not be forked".

As is apparent from the above, for a speculation fork instruction which is likely to be predicted as "will fork a thread" in the analysis that is carried out before actual execution of the instruction, information about that probability is included in the instruction. At the time of making a prediction, the number of states in history information which indicate possible forking is made different from the number of states which indicate that the thread of interest will not be forked. This scheme can permit the effective use of an analysis which is carried out before actual execution of an instruction.

This difference in the number of states can improve the probability of prediction, thus resulting in efficient generation of a new thread and efficient termination of a thread. This makes it possible to suppress the generation of unnecessary threads, which leads to a reduction in power consumption.

Although the foregoing description has discussed the case where prediction is implemented based on history information, information about the probability of forking a thread may be included in advance in an instruction when that instruction is compiled. The operation in this case will now be discussed.

Figure 7:
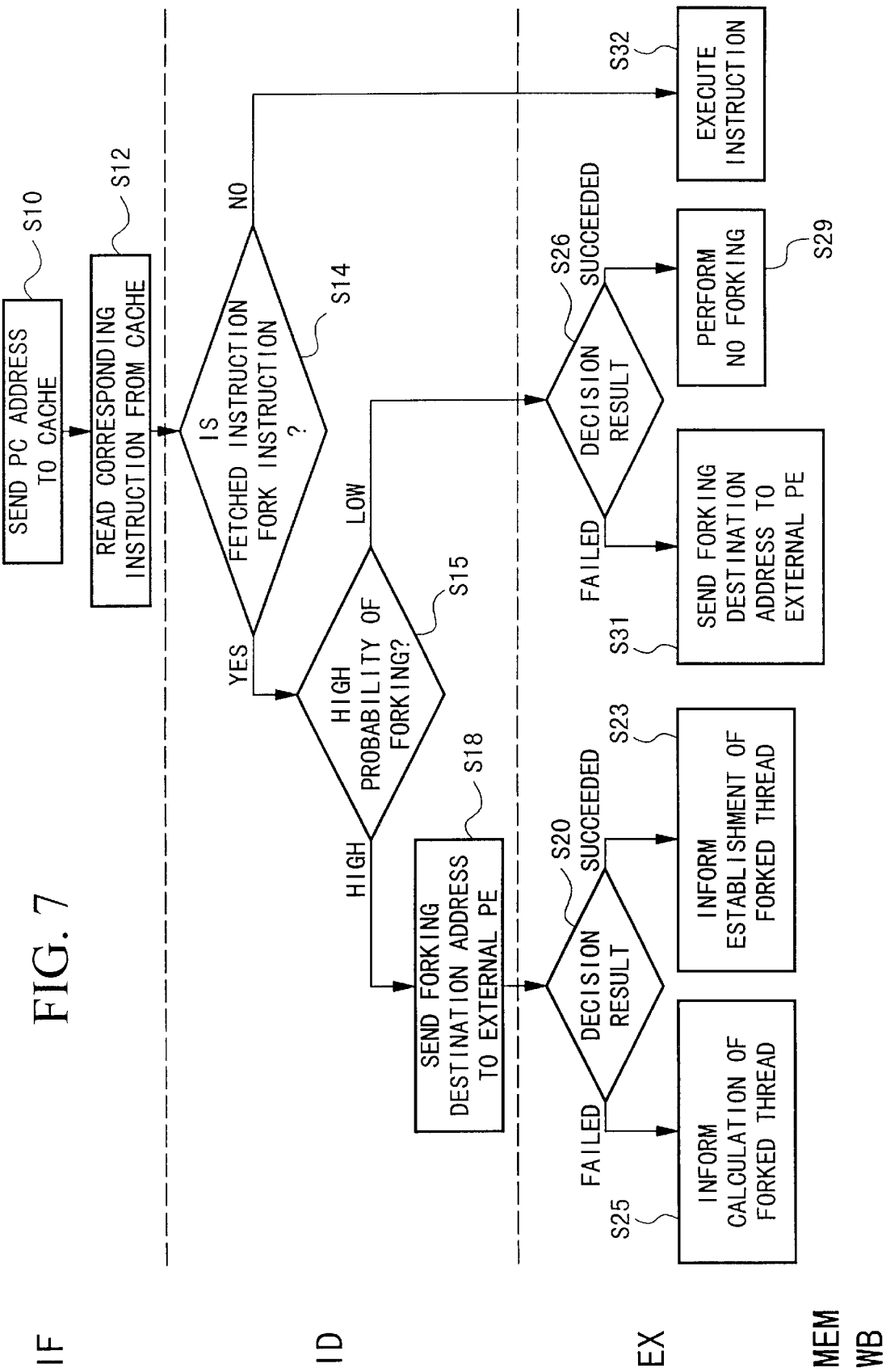
FIG. 7 is a flowchart illustrating the general operation of the parallel processing apparatus when an instruction includes information about the result of previous analysis of the probability of a fork condition.

FIG. 7 is a flowchart illustrating the general operation of the parallel processing apparatus when an instruction includes information about the results of previous analysis of the probability of a fork condition.

When the operation is initiated, the processor element 10 sends an address stored in the PC register 11 to the instruction cache 12 in the IF stage (step S10). Then, the instruction decoding section 13 fetches from the instruction cache 12 an instruction specified by the address sent to the instruction cache 12 from the PC register 11 (step S12).

In the next ID stage, the instruction decoding section 13 decodes the instruction fetched in step S12 and determines a process to be executed. The instruction decoding section 13 also determines if the decoded instruction is a speculation fork instruction (step S14). When the fetched instruction is a speculation fork instruction, the instruction decoding section 13 informs the fork-instruction predicting section 14 to that effect. When the decoded instruction is not a speculation fork instruction, on the other hand, this instruction is executed in step S32.

When informed of the instruction being a speculation fork instruction, the fork-instruction predicting section 14 predicts whether or not the probability that a thread will be forked, based on information about the results of previous analysis of the probability of a fork condition included in the instruction (step S15).

When it is predicted that the probability of forking a thread is "high", the fork-instruction predicting section 14 sends the address of the forking destination to the PC register 21 of the processor element 20 via the signal line 14a and the bus B (step S18). This process generates a new thread on the processor element 20 which in turn starts processing an instruction. The processing by the processor element 10 proceeds to step S20.

When it is predicted in step S15 that the probability of forking a thread is "low", the fork-instruction predicting section 14 does not generate a thread on the processor element 20 and proceeds to step S26.

In the EX stage, the instruction executing section 15 executes the instruction decoded by the instruction decoding section 13. The instruction executing section 15 also determines if the prediction of the speculation fork instruction is correct (steps S20 and S26).

When the decision result in step S20 is a "success", it means that the prediction that "the thread will be forked" has been successful. In this case, the execution of the instruction continues and the processor element 20 is informed of the establishment of the forked thread via the signal line 15b (step S23).

When the decision result in step S20 is a "failure", it means that the prediction that "the thread will be forked" has ended in failure and the processor element 20 is informed of that failure via the signal line 15b and the forked thread is canceled (step S25).

When the above processing is completed, the processor element 10 continues executing the instruction.

When the decision result in step S26 is a "success", it means that the prediction that "the thread will not be forked" has been successful, in which case forking a thread will not take place (step S29).

When the decision result in step S26 is a "failure", it means that the prediction that "the thread will not be forked" has ended in failure and the instruction executing section 15 sends the address of the forking destination to the PC register 21 of the processor element 20 via the signal line 15b and the bus B. As a result, a new thread is generated on the processor element 20 which in turns starts processing an instruction (step S31).

According to this embodiment, as discussed above, when information about the probability of forking a thread is included in an instruction, the fork-instruction predicting section 14 predicts forking of a thread based on the probability information, so that the generation of unnecessary threads can be suppressed by efficiently executing the generation of a new thread and the termination of a thread. This leads to a reduction in power consumption.

Second Embodiment

A parallel processing apparatus according to the second embodiment of this invention will be discussed below in detail with reference to the accompanying drawings.

Figure 8:
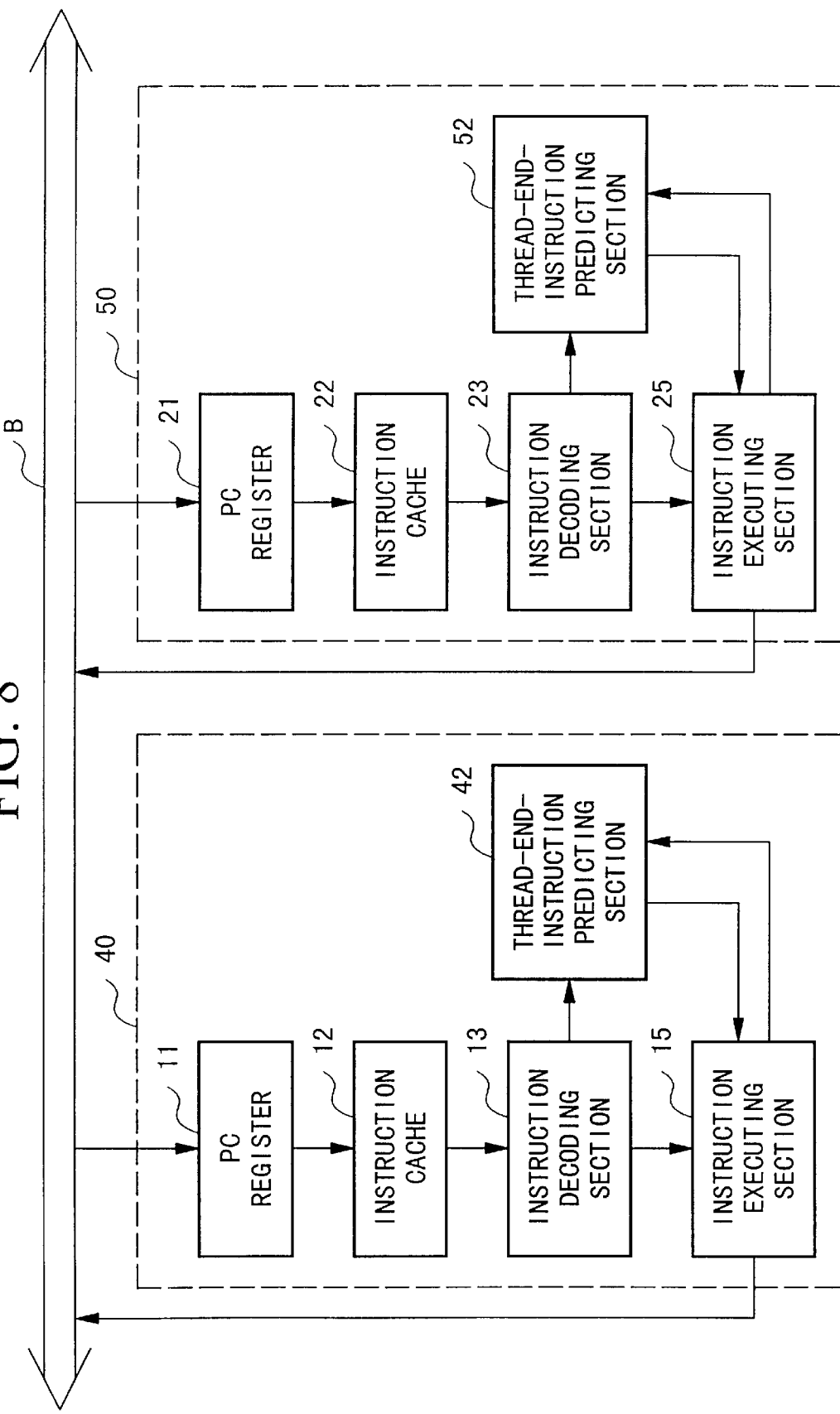
FIG. 8 is a block diagram illustrating the structure of a parallel processing apparatus according to a second embodiment of this invention.

FIG. 8 is a block diagram illustrating the structure of the parallel processing apparatus according to the second embodiment of this invention.

As shown in FIG. 8, the parallel processing apparatus according to the second embodiment of this invention has two sets of processor elements (PE) 40 and 50 which are connected together by a bus B. The processor element 40 comprises a program counter register (hereinafter called "PC register") 11, an instruction cache 12, an instruction decoding section 13, a thread-end-instruction predicting section 42, and an instruction executing section 15. The processor element 50 likewise comprises a program counter register 21, an instruction cache 22, an instruction decoding section 23, a thread-end-instruction predicting section 52, and an instruction executing section 25.

Those of the components, excluding the thread-endinstruction predicting sections 42 and 52, are the same as the above-described corresponding components of the first embodiment that have the same reference numerals. In accordance with history information of a thread-end instruction retained in the thread-end-instruction predicting section 42 or 52, that predicting section 42 or 52 predicts whether or not a thread-end-conditioned thread-end instruction terminates a thread.

The general operation of the parallel processing apparatus with the above-described structure according to the second embodiment of this invention will be discussed below.

Figure 9:
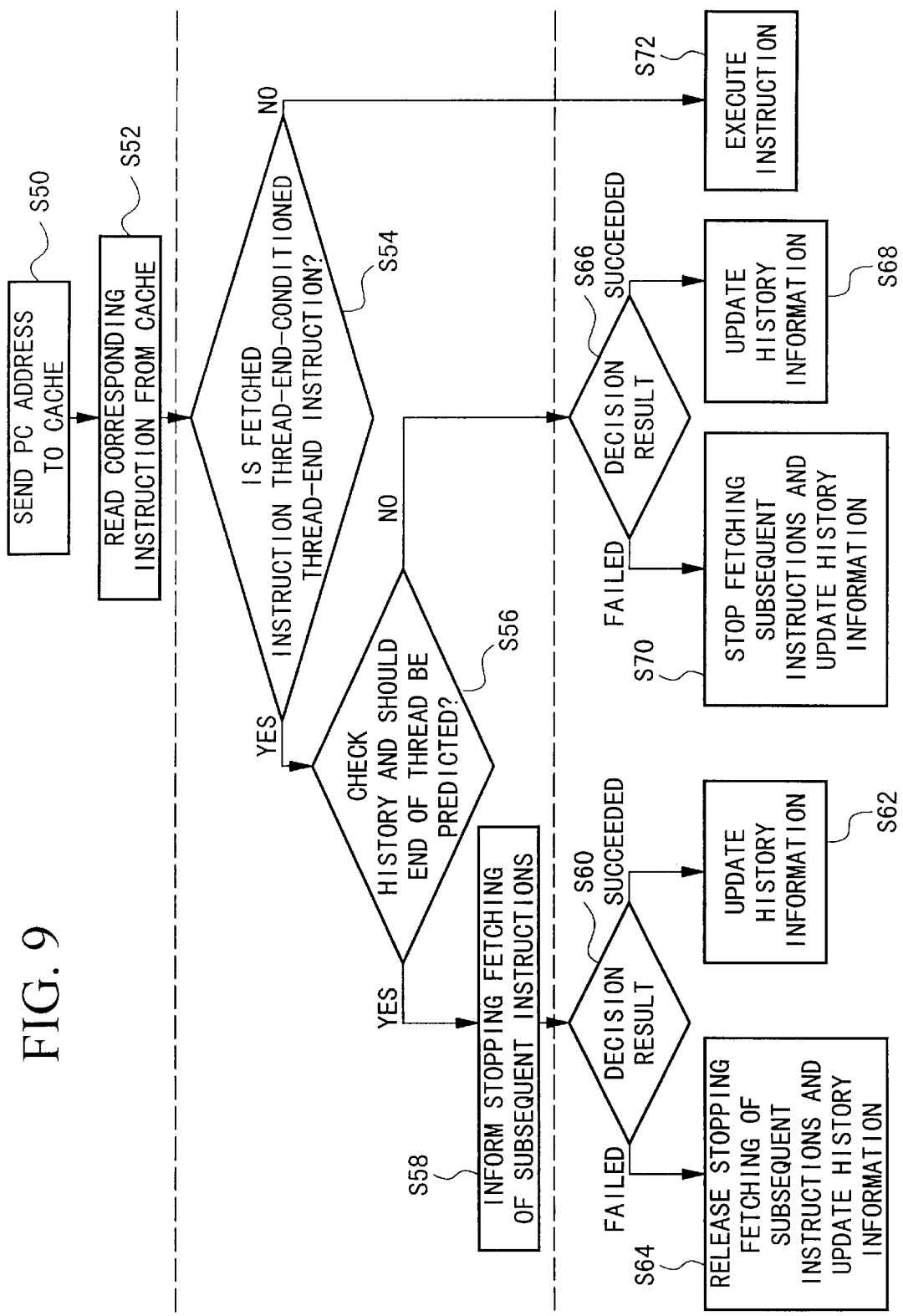
FIG. 9 is a flowchart illustrating the general operation of the parallel processing apparatus according to the second embodiment of this invention.

FIG. 9 is a flowchart illustrating the general operation of the parallel processing apparatus according to the second embodiment of this invention.

In FIG. 9, IF, ID, EX, MEM and WB are pipeline stages and respectively indicate the instruction fetching stage, the instruction decoding stage, the instruction executing stage, the memory access stage, and the write-back stage.

In the IF stage, the processor element 40 sends an address stored in the PC register 11 to the instruction cache 12 (step S50). Then, the instruction decoding section 13 fetches from the instruction cache 12 an instruction specified by the address sent to the instruction cache 12 from the PC register 11 (step S52).

In the next ID stage, the instruction decoding section 13 decodes the instruction fetched in step S12 and determines a process to be executed. The instruction decoding section 13 also determines if the decoded instruction is a thread-end-conditioned thread-end instruction (step S54). When the fetched instruction is a thread-end-conditioned thread-end instruction, the instruction decoding section 13 informs the thread-endinstruction predicting section 42 to that effect. When the decoded instruction is not a thread-end-conditioned thread-end instruction, on the other hand, this instruction is executed in step S72.

When informed of the instruction being a thread-end-conditioned thread-end instruction, the thread-end-instruction predicting section 42 predicts whether or not the thread-end-conditioned thread-end instruction will terminate a thread in accordance with the history information of the fork instruction that is held in the predicting section 42 (step S56).

When the decision result is "YES", i.e., when it is predicted that the thread-end-conditioned thread-end instruction will end a thread, the thread-end-instruction predicting section 42 sends information indicating the termination of the thread to the instruction executing section 15 (step S58).

When the decision result in step S56 is "NO", i.e., when it is predicted that the thread will be terminated, the thread-endinstruction predicting section 42 does not send information indicating the termination of the thread and proceeds to step S66.

In the EX stage, the instruction executing section 15 executes the instruction decoded by the instruction decoding section 13. The instruction executing section 15 also determines if the prediction of the thread-end-conditioned thread-end instruction is correct (steps S60 and S66).

When the decision result in step S60 is a "success", it means that the prediction that "the thread will be terminated" has been successful. In this case, the instruction executing section 15 informs the thread-end-instruction predicting section 42 of the "successful prediction". Further, the thread-endinstruction predicting section 42 updates the history information of the thread-end-conditioned thread-end instruction (step S62).

When the decision result in step S60 is a "failure", it means that the prediction that "the thread will be terminated" has ended in failure. In this case, stopping the fetching of subsequent instructions is released and the instruction executing section 15 sends the address of a subsequent instruction to the PC register 11 via the bus B. The instruction executing section 15 informs the thread-end-instruction predicting section 42 of the "prediction failure". When informed of the failure, the thread-end-instruction predicting section 42 updates the history information of the thread-end-conditioned thread-end instruction (step S64).

When the above processing is completed, the processor element 40 continues executing the instruction.

When the decision result in step S66 is a "success", it means that the prediction that "the thread will not be terminated" has been successful and the instruction executing section 15 informs the thread-end-instruction predicting section 42 of the "successful prediction". Then, the thread-endinstruction predicting section 42 updates the history information of the thread-end-conditioned thread-end instruction (step S68).

When the decision result in step S66 is a "failure", it means that the prediction that "the thread will not be terminated" has ended in failure and the fetching subsequent instructions is stopped. The instruction executing section 15 informs the thread-end-instruction predicting section 42 of the "prediction failure" and the thread-end-instruction predicting section 42 updates the history information of the thread-end-conditioned thread-end instruction (step S60).

According to this embodiment, as described above, the provision of the thread-end-instruction predicting sections 42 and 52 which predict the execution condition of a thread-end-conditioned thread-end instruction using the history information can achieve efficient termination of a thread and eventually leads to a reduction in power consumption.

An explanation will now be given of an algorithm for predicting the termination of a thread by using history information which is used in the thread-end-instruction predicting sections 42 and 52 in FIG. 8.

Figure 10:
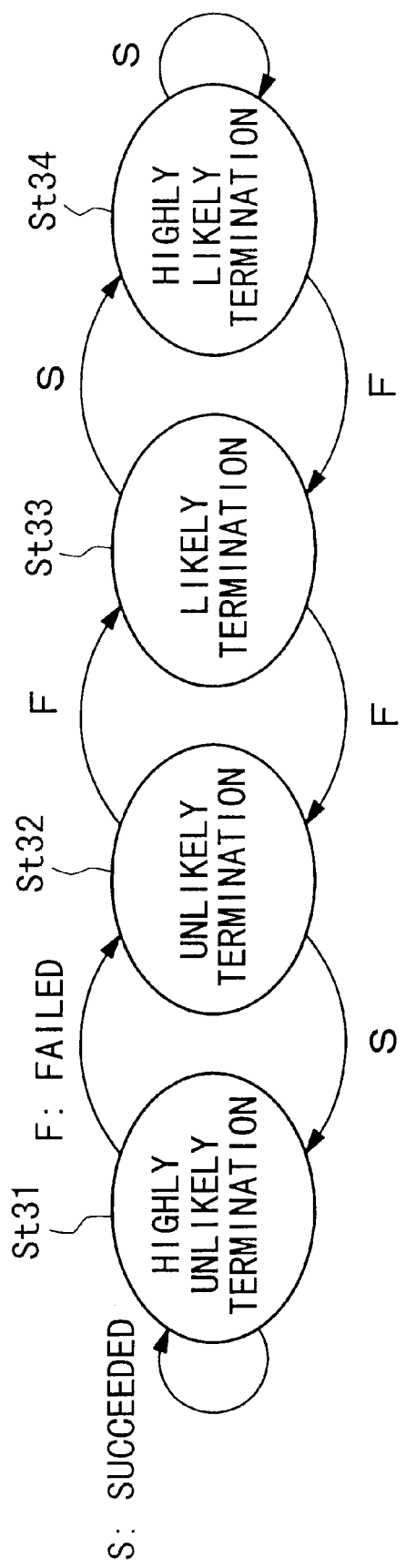
FIG. 10 is a status-transition chart for explaining an algorithm for predicting the end of a thread by using history information which is used in a thread-end-instruction predicting section 42.

FIG. 10 is a status-transition chart for explaining the algorithm for predicting the end of a thread by using history information which is used in the thread-end-instruction predicting section 42.

The history information stored in the history buffer which is provided in the thread-end-instruction predicting section 42 can represent four states. The four states are:

highly unlikely termination (St 31) unlikely termination (St 32) likely termination (St 33) highly likely termination (St 34)

When the history information indicates either "highly unlikely termination" (St 31) or "unlikely termination" (St 32), the predicting section 34 predicts that a thread will not be terminated. When the history information indicates either "likely termination" (St 33) or "highly likely termination" (St 34), the predicting section 34 predicts that a thread will be terminated.

The state of the history information changes in accordance with the result of a decision on prediction as follows.

In the case where the history information specifies "highly unlikely termination" (St 31), when the prediction is a success, the state does not change and remains as "highly unlikely termination" (St 31). When prediction is a failure, the state changes to "unlikely termination" (St 32).

In the case where the history information specifies "unlikely termination" (St 32), when the prediction is a success, the state changes to "highly unlikely termination" (St 31). When the prediction ends in failure, the state changes to "likely termination" (St 33).

In the case where the history information specifies "likely termination" (St 33), when the prediction is successful, the state changes to "highly likely termination" (St 34). When the prediction is unsuccessful, the state changes to "unlikely termination" (St 32).

In the case where the history information specifies "highly likely termination" (St 34), when the prediction is successful, the state does not change and stays as "highly likely termination" (St 34). When the prediction ends in failure, the state changes to "likely termination" (St 33).

Using the above algorithm, the predicting section 34 predicts whether or not to end a thread based on the input history information.

The foregoing description of the first embodiment has mainly discussed the case where a thread is to be generated (forked) and the foregoing description of the second embodiment has mainly discussed the case where a thread generated by forking is to be terminated. It is however preferable that a parallel processing apparatus should have the combined structure of the first embodiment and the second embodiment in order to achieve the objects of this invention. That is, it is preferable that the parallel processing apparatus of this invention is equipped with means that predicts both the forking of a thread and the termination of a thread.

According to those embodiments, information about the probability of terminating a thread may be included in advance in an instruction at the time of compiling the instruction, so that when this information is included in an instruction, the thread-end-instruction predicting section 42 predicts the termination of a thread based on that probability information.

Third Embodiment

A parallel processing apparatus according to the third embodiment of this invention will specifically be discussed below.

The parallel processing apparatus according to the third embodiment of this invention fundamentally has the same structure as the combined structure of the first and second embodiments. The third embodiment differs from the first embodiment in the operation of the fork-instruction predicting section 14 or 24 shown in FIG. 1, particularly the operation of the predicting section 34 shown in FIG. 2. According to this embodiment, in the parallel processing apparatus, a branching-etc. predicting section 60 is provided in place of the fork-instruction predicting section 14 or 24 of the first embodiment, so that when any one of a conditional branching instruction, a speculation fork instruction, and a thread-end-conditioned thread-end instruction is input, the generation or termination of a thread is carried out based on the history information.

Figure 11:
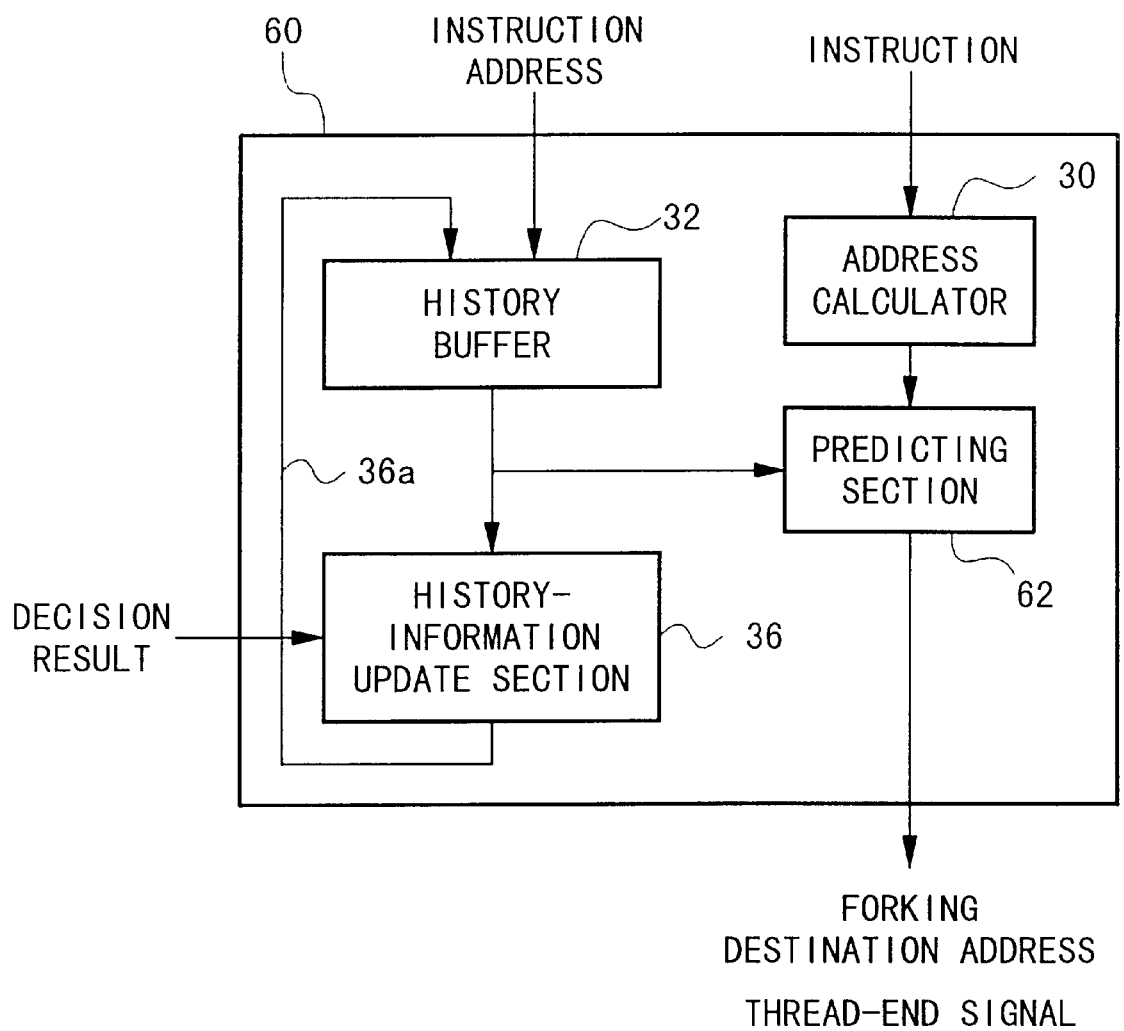
FIG. 11 is a block diagram illustrating the structure of a branching-etc. predicting section 60 included in a parallel processing apparatus according to a third embodiment of this invention.
Figure 13:
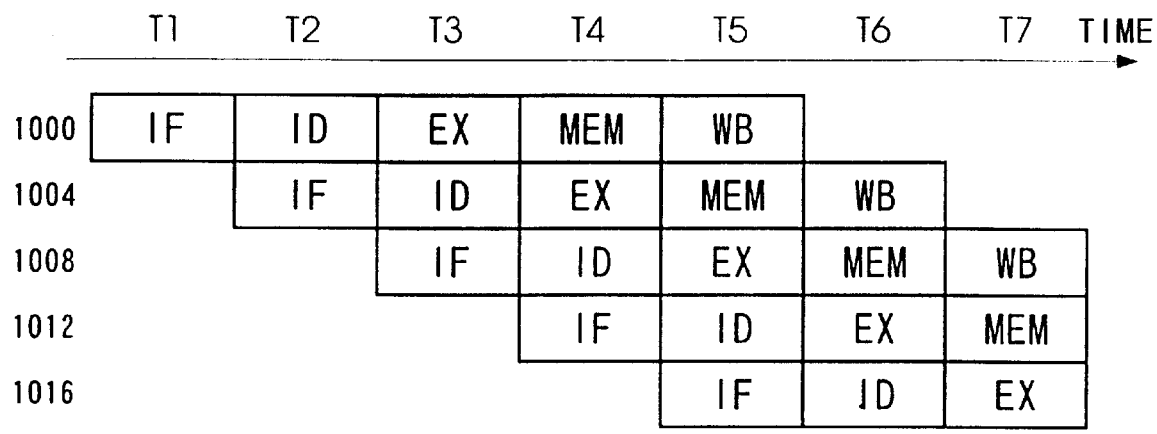
FIG. 13 is a diagram for explaining a pipelining process.
Figure 14:
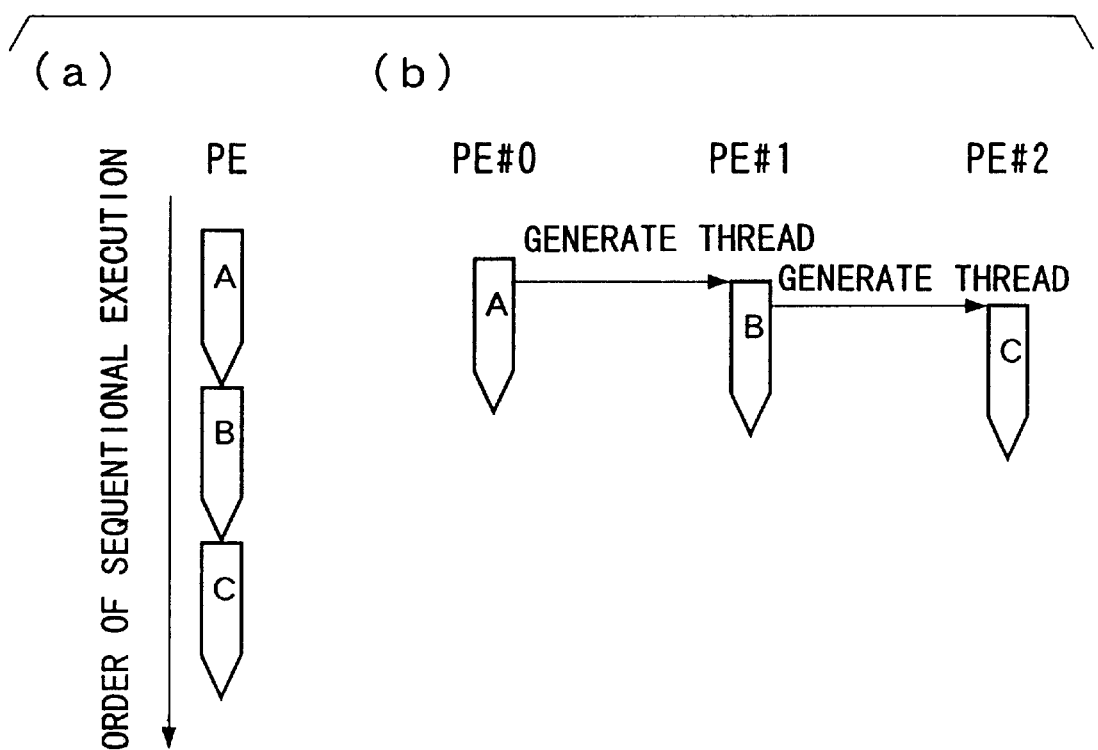
FIG. 14 is a diagram showing a model of multi-stream control.

FIG. 11 is a block diagram illustrating the structure of the branching-etc. predicting section 60 included in the parallel processing apparatus according to the third embodiment of this invention.

The branching-etc. predicting section 60 comprises an address calculator 30, a history buffer 32, a predicting section 62, and a history-information update section 36. The address calculator 30, the history buffer 32 and the history-information update section 36 are the same as those of the first and second embodiments which have already been discussed.

With this structure, when a conditional branching instruction, a speculation fork instruction, or a thread-end-conditioned thread-end instruction is confirmed in the instruction decoding stage, the instruction is input to the address calculator 30 and its instruction address is input to the history buffer 32. When the instruction address and the instruction are input to the branching-etc. predicting section 60, history information is output from the history buffer 32 in accordance with each instruction address. When the input instruction is a conditional branching instruction or a speculation fork instruction, the address calculator 30 computes the instruction address of the branching destination or the forking destination, depending on the type of the instruction.

The history information output from the history buffer 32 is input to the history-information update section 36 and the predicting section 62. In the case of a conditional branching instruction or speculation fork instruction, the predicting section 62 sends out the address computed by the address calculator 30.

When the input instruction is a thread-end-conditioned thread-end instruction, the predicting section 62 sends out a thread-end signal according to the history information.

It is to be noted that the predicting section 62 performs predicting in the same manner as done in the first and second embodiments.

When the result of a decision from the instruction executing section (not shown) is input to the history-information update section 36, the history-information update section 36 updates the history information of the predicted instruction and writes back the updated history information in the history buffer 32.

As described above, this embodiment can integrate a series of predictions about a conditional branching instruction, a speculation fork instruction, and a thread-end-conditioned thread-end instruction.

FIG. 12 is a table for explaining the history information in the history buffer 32. The history information indicates four states using 2-bit signals. Specifically, the four states are distinguished from one another by "00", "01", "10" and "11".

The history information of a conditional branching instruction, a speculation fork instruction, a speculation fork instruction including analysis information before execution, a thread-end-conditioned thread-end instruction, and a thread-end-conditioned thread-end instruction including analysis information before execution is indicated by the four states.

Analyzing whether the instruction input to the branching-etc. predicting section is one of the instructions shown in FIG. 12 can allow the entries in the history buffer 32 to be shared.

According to this embodiment as in the other embodiments, information about the probability of forking a thread, information about the probability of terminating a thread, or information about the probability of a conditional branching instruction may be included in advance in an instruction when that instruction is compiled, so that when this information is included in an instruction, the forking of a thread, the termination of a thread, or a conditional branching instruction is predicted based on that probability information.

In short, as is apparent from the foregoing description, this invention has the following advantages.

In a processor system that carries out parallel processing using a plurality of processors, fork instructions for activating a plurality of processors are efficiently executed, thus making is possible a reduction of power consumption.

It is also possible to efficiently terminate a thread with respect to a thread-end-conditioned thread-end instruction.

Further, it is possible to provide a hardware unit which can carry out a series of predictions about a conditional branching instruction, a speculation fork instruction, and a thread-end-conditioned thread-end instruction.

What is claimed is:

1. A parallel processing apparatus having processing means for generating (forking) a thread consisting of a plurality of instructions on an external unit,
    said processing means including a predicting section for predicting whether or not a fork condition of a fork-conditioned fork instruction is satisfied after fetching but before executing said instruction.

2. The parallel processing apparatus according to claim 1, wherein in addition to making said prediction, when an input instruction is a conditional branching instruction, said predicting section predicts whether or not said conditional branching instruction is satisfied.

3. The parallel processing apparatus according to claim 2, wherein a plurality of said processing means are provided.

4. The parallel processing apparatus according to claim 3, wherein said predicting section makes said prediction using history information.

5. The parallel processing apparatus according to claim 4, wherein said history information has a plurality of states according to the probabilities of said prediction.

6. The parallel processing apparatus according to claim 5, wherein said predicting section predict said fork condition, a thread-end condition, or said conditional branching instruction based on said states.

7. The parallel processing apparatus according to claim 5, wherein said processing means further includes memory means for storing said history information associated with at least two of said fork condition, a thread-end condition, and said conditional branching instruction.

8. The parallel processing apparatus according to claim 3, wherein history information has a plurality of states according to the probabilities of said prediction.

9. The parallel processing apparatus according to claim 8, wherein said predicting section predicts said fork condition, a thread-end condition, or said conditional branching instruction based on said states.

10. The parallel processing apparatus according to claim 8, wherein said processing means further includes memory means for storing said history information associated with at least two of said fork condition, a thread-end condition, and said conditional branching instruction.

11. The parallel processing apparatus according to claim 2, wherein said predicting section makes said prediction using history information.

12. The parallel processing apparatus according to claim 11, wherein said history information has a plurality of states according to the probabilities of said prediction.

13. The parallel processing apparatus according to claim 12, wherein said predicting section predicts said fork condition, a thread-end condition, or said conditional branching instruction based on said states.

14. The parallel processing apparatus according to claim 12, wherein said processing means further includes memory means for storing said history information associated with at least two of said fork condition, a thread-end condition, and said conditional branching instruction.

15. The parallel processing apparatus according to claim 2, wherein history information has a plurality of states according to the probabilities of said prediction.

16. The parallel processing apparatus according to claim 15, wherein said predicting section predicts said fork condition, a thread-end condition, or a conditional branching instruction based on said states.

17. The parallel processing apparatus according to claim 15, wherein said processing means further includes memory means for storing said history information associated with at least two of said fork condition, a thread-end condition, and said conditional branching instruction.

18. The parallel processing apparatus according to claim 2, wherein said processing means further includes address generating means for generating a top instruction address of a thread to be generated when said fork condition is satisfied and generating an instruction address of a branching target when said conditional branching instruction is satisfied.

19. The parallel processing apparatus according to claim 1, wherein a plurality of said processing means are provided.

20. The parallel processing apparatus according to claim 1, wherein said predicting section makes said prediction using history information.

21. The parallel processing apparatus according to claim 1, wherein history information has a plurality of states according to the probabilities of said prediction.

22. The parallel processing apparatus according to claim 21, wherein said predicting section predicts said fork condition, a thread-end condition, or a conditional branching instruction based on said states.

23. The parallel processing apparatus according to claim 21, wherein said processing means further includes memory means for storing said history information associated with at least two of said fork condition, a thread-end condition, and a conditional branching instruction.

24. The parallel processing apparatus according to claim 1, wherein said fork-conditioned fork instruction includes information about a result of a previous analysis of a probability of said fork condition; and
    said predicting section predicts whether or not said fork condition is satisfied in accordance with said probability.

25. A parallel processing apparatus comprising processing means having means for issuing an externally forked thread, said processing means including a predicting section predicting whether or not a thread-end condition of a thread-end-conditioned thread-end instruction for terminating said forked thread is satisfied after fetching but before executing said instruction.

26. The parallel processing apparatus according to claim 25, wherein in addition to making said prediction, when an input instruction is a conditional branching instruction, said predicting section predicts whether or not said conditional branching instruction is satisfied.

27. The parallel processing apparatus according to claim 26, wherein a plurality of said processing means are provided.

28. The parallel processing apparatus according to claim 27, wherein said predicting section makes said prediction using history information.

29. The parallel processing apparatus according to claim 28, wherein said history information has a plurality of states according to the probabilities of said prediction.

30. The parallel processing apparatus according to claim 29, wherein said predicting section predict a fork condition, said thread-end condition, or said conditional branching instruction based on said states.

31. The parallel processing apparatus according to claim 29, wherein said processing means further includes memory means for storing said history information associated with at least two of a fork condition, said thread-end condition, and said conditional branching.

32. The parallel processing apparatus according to claim 27, wherein history information has a plurality of states according to the probabilities of said prediction.

33. The parallel processing apparatus according to claim 32, wherein said predicting section predicts a fork condition, said thread-end condition, or said conditional branching instruction based on said states.

34. The parallel processing apparatus according to claim 32, wherein said processing means further includes memory means for storing said history information associated with at least two of a fork condition, said thread-end condition, and said conditional branching instruction.

35. The parallel processing apparatus according to claim 26, wherein said predicting section makes said prediction using history information.

36. The parallel processing apparatus according to claim 35, wherein said history information has a plurality of states according to the probabilities of said prediction.

37. The parallel processing apparatus according to claim 36, wherein said predicting section predicts a fork condition, said thread-end condition, or said conditional branching instruction based on said states.

38. The parallel processing apparatus according to claim 36, wherein said processing means further includes memory means for storing said history information associated with at least two of a fork condition, said thread-end condition, and said conditional branching instructions.

39. The parallel processing apparatus according to claim 26, wherein history information has a plurality of states according to the probabilities of said prediction.

40. The parallel processing apparatus according to claim 39, wherein said predicting section predicts a fork condition, said thread-end condition, or said conditional branching instruction based on said states.

41. The parallel processing apparatus according to claim 39, wherein said processing means further includes memory means for storing said history information associated with at least two of said fork condition, a thread-end condition, and said conditional branching instruction.

42. The parallel processing apparatus according to claim 26, wherein said processing means further includes address generating means for generating a top instruction address of a thread to be generated when said fork condition is satisfied and generating an instruction address of a branching target when said conditional branching instruction is satisfied.

43. The parallel processing apparatus according to claim 25, wherein a plurality of said processing means are provided.

44. The parallel processing apparatus according to claim 25, wherein said predicting section makes said prediction using history information.

45. The parallel processing apparatus according to claim 25, wherein history information has a plurality of states according to the probabilities of said prediction.

46. The parallel processing apparatus according to claim 45, wherein said predicting section predicts a fork condition, said thread-end condition, or a conditional branching instruction based on said states.

47. The parallel processing apparatus according to claim 45, wherein said processing means further includes memory means for storing said history information associated with at least two of a fork condition, said thread-end condition, and a conditional branching instruction.

48. The parallel processing apparatus according to claim 25, wherein said thread-end-conditioned thread-end instruction includes information about a result of a previous analysis of a probability of said thread-end condition; and said predicting section predicts whether or not said thread-end condition is satisfied in accordance with said probability.

49. A parallel processing apparatus comprising processing means for generating a thread consisting of a plurality of instructions on an external unit, said processing means including:

means for issuing an externally forked thread; and a predicting section for predicting of whether or not a fork condition of a fork-conditioned fork instruction is satisfied after fetching but before executing said fork instruction and whether or not a thread-end condition of a thread-end-conditioned thread-end instruction for terminating said forked thread is satisfied after fetching but before executing said thread-end instruction.

50. The parallel processing apparatus according to claim 49, wherein in addition to making said prediction, when an input instruction is a conditional branching instruction, said predicting section predicts whether or not said conditional branching instruction is satisfied.

51. The parallel processing apparatus according to claim 50, wherein a plurality of said processing means are provided.

52. The parallel processing apparatus according to claim 51, wherein said predicting section makes said prediction using history information.

53. The parallel processing apparatus according to claim 52, wherein said history information has a plurality of states according to the probabilities of said prediction.

54. The parallel processing apparatus according to claim 53, wherein said predicting section predicts said fork condition, said thread-end condition, or said conditional branching instruction based on said states.

55. The parallel processing apparatus according to claim 53, wherein said processing means further includes memory means for storing said history information associated with at least two of said fork condition, said thread-end condition, and said conditional branching instruction.

56. The parallel processing apparatus according to claim 51, wherein history information has a plurality of states according to the probabilities of said prediction.

57. The parallel processing apparatus according to claim 56, wherein said predicting section predicts said fork condition, a thread-end condition, or said conditional branching instruction based on said states.

58. The parallel processing apparatus according to claim 56, wherein said processing means further includes memory means for storing said history information associated with at least two of said fork condition, said thread-end condition, and said conditional branching instruction.

59. The parallel processing apparatus according to claim 50, wherein said predicting section makes said prediction using history information.

60. The parallel processing apparatus according to claim 59, wherein said history information has a plurality of states according to the probabilities of said prediction.

61. The parallel processing apparatus according to claim 60, wherein said predicting section predicts said fork condition, said thread-end condition, or said conditional branching instruction based on said states.

62. The parallel processing apparatus according to claim 60, wherein said processing means further includes memory means for storing said history information associated with at least two of said fork condition, said thread-end condition, and said conditional branching instruction.

63. The parallel processing apparatus according to claim 50, wherein history information has a plurality of states according to the probabilities of said prediction.

64. The parallel processing apparatus according to claim 63, wherein said predicting section predicts said fork condition, said thread-end condition, or a conditional branching instruction based on said states.

65. The parallel processing apparatus according to claim 63, wherein said processing means further includes memory means for storing said history information associated with at least two of said fork condition, said thread-end condition, and said conditional branching instruction.

66. The parallel processing apparatus according to claim 50, wherein said processing means further includes address generating means for generating a top instruction address of a thread to be generated when said fork condition is satisfied and generating an instruction address of a branching target when said conditional branching instruction is satisfied.

67. The parallel processing apparatus according to claim 49, wherein a plurality of said processing means are provided.

68. The parallel processing apparatus according to claim 49, wherein said predicting section makes said prediction using history information.

69. The parallel processing apparatus according to claim 49, wherein history information has a plurality of states according to the probabilities of said prediction.

70. The parallel processing apparatus according to claim 69, wherein said predicting section predicts said fork condition, said thread-end condition, or a conditional branching instruction based on said states.

71. The parallel processing apparatus according to claim 69, wherein said processing means further includes memory means for storing said history information associated with at least two of said fork condition, said thread-end condition, and a conditional branching instruction.

72. The parallel processing apparatus according to claim 49, wherein said fork-conditioned fork instruction includes information about the results of a previous analysis of a probability of said fork condition, and a probability of said thread-end condition; and said predicting section predicts whether or not said fork condition and said thread-end condition are satisfied in accordance with said probabilities.

73. A parallel processing apparatus comprising:

analysis means for analyzing an input instruction;

prediction means for, when said instruction analyzed by said analysis means is a fork-conditioned fork instruction, predicting whether or not a fork condition of said fork-conditioned fork instruction is satisfied after fetching but before executing said instruction and sending out a fork instruction in accordance with a result of said prediction; and execution means for executing said instruction, deciding whether or not said prediction of said fork instruction is correct, and sending out an instruction to cancel a thread generated by said fork instruction, when said fork instruction has been sent out and said prediction is wrong.

74. The parallel processing apparatus according to claim 73, wherein said prediction means includes memory means for storing history information and update means for updating said history information stored in said memory means;

said execution means informs said update means of a result of said decision; and said update means updates said history information in accordance with said result of said decision.

75. A parallel processing apparatus comprising:

analysis means for analyzing an input instruction;

prediction means for, when said instruction analyzed by said analysis means is a thread-end-conditioned thread-end instruction for terminating a forked thread, predicting whether or not a thread-end condition of said thread-end-conditioned thread-end instruction is satisfied after fetching but before executing said instruction and sending out a thread-end instruction in accordance with a result of said prediction; and execution means for executing said instruction, deciding whether or not said prediction of said thread-end instruction is correct, and sending out an instruction to cancel stopping of a thread which has been stopped by said thread-end instruction, when said thread-end instruction has been sent out and said prediction is wrong.

76. The parallel processing apparatus according to claim 75, wherein said prediction means includes memory means for storing history information and update means for updating said history information stored in said memory means;

said execution means informs said update means of a result of said decision; and said update means updates said history information in accordance with said result of said decision.

* * * * *